May 7, 1963 R. M. BONE 3,088,675
ILLUMINATED WATER SPRAYER
Filed Dec. 15, 1960 3 Sheets-Sheet 1
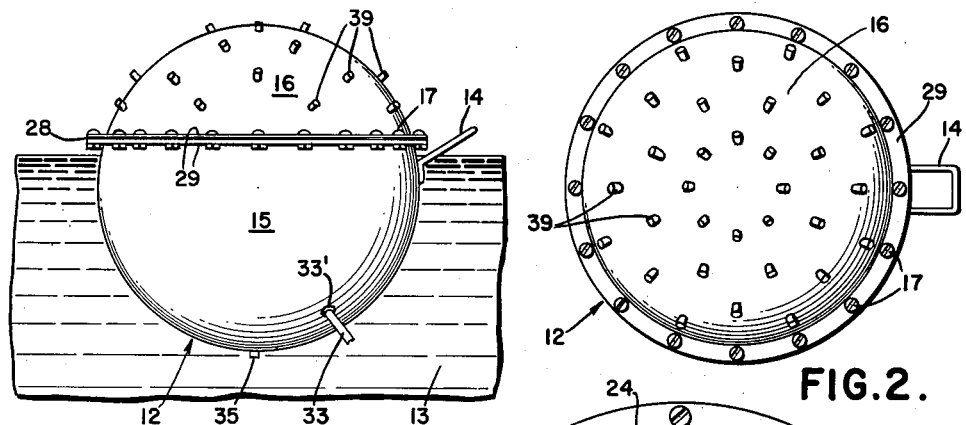
FIG.1.
FIG.2.
FIG.4.
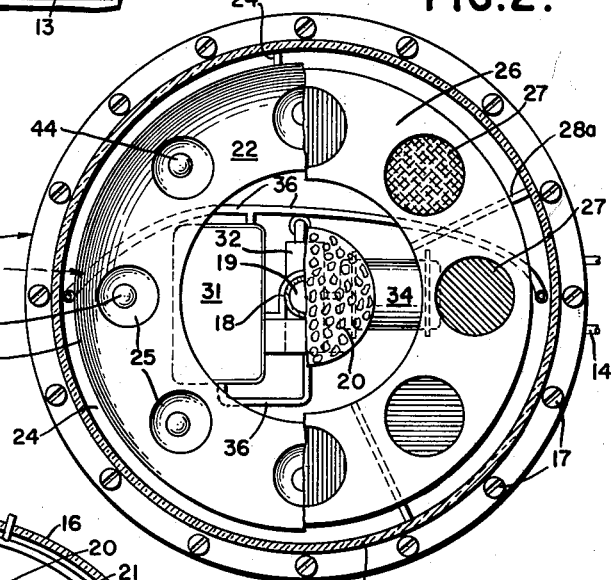
FIG.3.
INVENTOR
Revella M. Bone
BY John A. Mawhinney
ATTORNEY

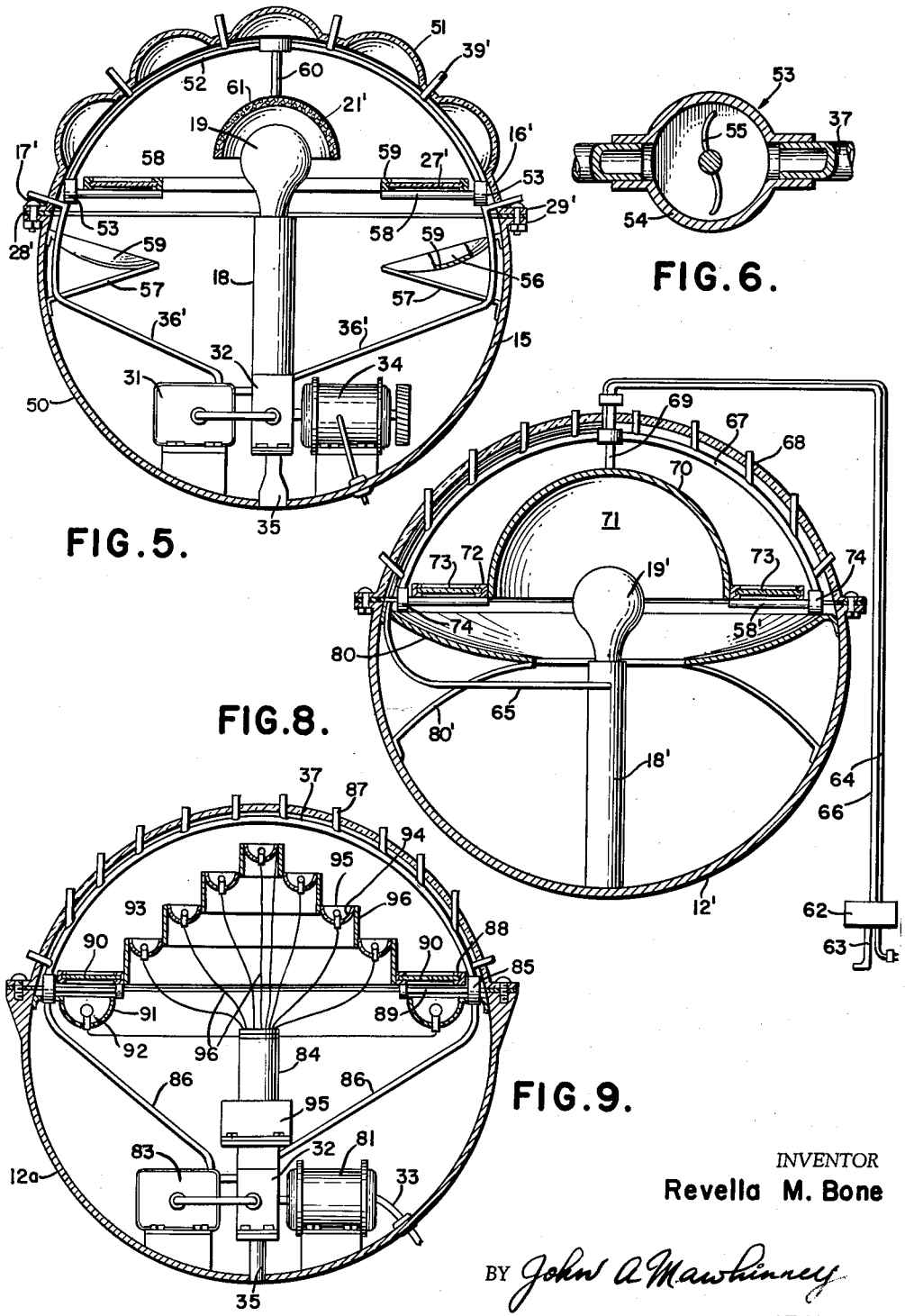

May 7, 1963 — R. M. BONE — 3,088,675
ILLUMINATED WATER SPRAYER
Filed Dec. 15, 1960 — 3 Sheets-Sheet 3

INVENTOR
Revella M. Bone
BY John A. Mawhinney
ATTORNEY

United States Patent Office 3,088,675
Patented May 7, 1963

3,088,675
ILLUMINATED WATER SPRAYER
Revella M. Bone, 426 N. 1st E., Tremonton, Utah
Filed Dec. 15, 1960, Ser. No. 76,041
3 Claims. (Cl. 239—20)

This invention relates to an illuminated water sprayer or shower unit capable of manufacture in many different constructions and aims to give a novel aesthetic appearance at night about swimming pools or any body of water, on lawns, and in gardens for instance, to enhance the enjoyment generally and especially of visits, parties and stays at motels or other hostelries.

One important object is to provide the invention with an apparatus-enclosing body which is light in weight so as to be inexpensive and capable of manufacture primarily or entirely of plastic, fibrous material or any equivalent.

A second object is to give effect to the invention in some forms having the said body shaped as a buoyant hollow sphere or the equivalent which is rockable so that the motion of a sustaining body of water will be imparted to the body and coact with contained mechanism to give an exterior shower in combination with novel illumination with intermingled coloring or hues.

A third object is to provide the invention with the hollow body or casing in the spherical or bell-shape so weighted by the contained mechanism that it will be partially submerged in order that the surrounding water will effectively cool the contained operating parts.

A fourth object is to provide a buoyant spherical construction according to the invention having attached thereto, interiorly thereof, means to spray water in a shower from the body in which it flows and discharge the same in shower effect, in combination with a central illuminating means and support utilizing a motor and tank with water under pressure on opposite sides of the support, in combination with a pump so weighting and balancing the spherical structure in water that the main axis of said illuminating means and support will normally be truly vertical and will always seek the vertical notwithstanding the motion of the water.

A fifth object is to provide the invention in forms for use both in a body of water and on land.

A sixth object of the invention is to provide a form thereof wherein the water used is supplied to and maintained in a reservoir constituting part of the unit.

A seventh object of the invention is to associate with the light rays reflected within the spherical body a color screen which may be either stationary or rotatable as preferred.

Various additional objects and advantages will become apparent from the examples shown in the accompanying drawings and described hereinafter.

In said drawings:

FIG. 1 is a view in elevation showing one adaptation of my improved sprayer apparatus buoyed in a pool or other body of water;

FIG. 2 is a top plan view of the sprayer apparatus of FIG. 1;

FIG. 3 is a vertical sectional view on an enlarged scale taken substantially centrally through the apparatus of FIG. 1;

FIG. 4 is a horizontal sectional view taken substantially on the line 4—4 of FIG. 3;

FIG. 5 is a vertical sectional view taken on a plane corresponding to that of FIG. 3, but through a modified form;

FIG. 6 is an enlarged view through an impeller and its connections which may be employed in the water discharging or spray head of FIG. 5;

FIG. 8 is a vertical sectional view taken substantially on the same plane as FIGS. 3 and 5 through another modified form;

FIG. 9 is a vertical sectional view taken substantially on the same plane as FIG. 3, but with a modified form of illuminating, reflecting and coloring means;

Referring to the drawings, wherein like reference characters designate like or similar parts, a number of different embodiments which carry out the invention are shown and described by way of example.

Figure 10:
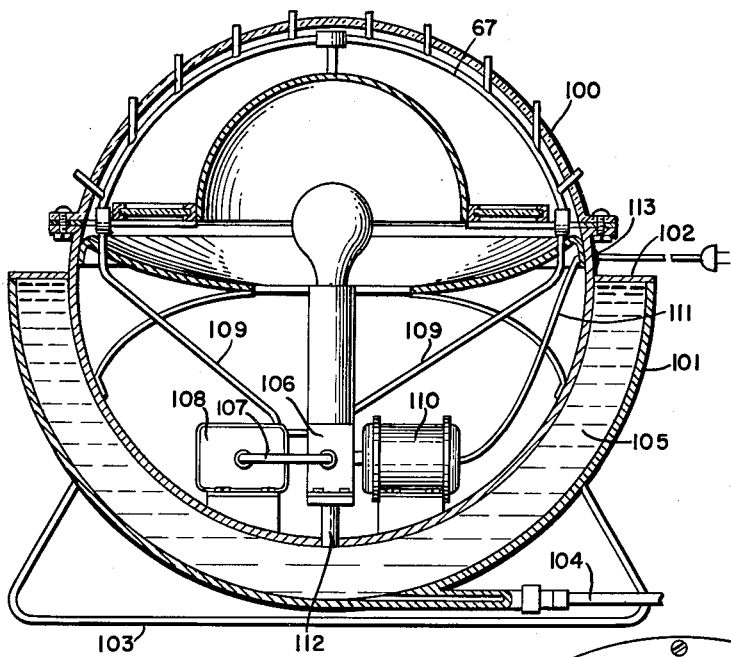
FIG. 10 is a vertical section taken substantially on the same plane as FIG. 3 of a ground-supported form.

The first of said embodiments is shown in FIGS. 1 through 4. It consists of a hollow spherical body generally designated 12 which is buoyant and floatable in a pool or body of water as suggested at 13. Such spherical body 12 may consist of any number of different sections and be fabricated from any desired but preferably light material to enable manual handling facilitated by a handle 14. For instance body 12 is made with a lower section 15 which for example is larger than a semi-hemisphere and made of plastic, fibrous or any equivalent lightweight material. An upper section 16 bolted or otherwise fastened watertight at 17 completes the spherical body, such section 16 being of plastic, fibrous or any equivalent material like section 15, but preferably being diaphanous, that is, transparent or translucent, in order that light rays may penetrate the same.

The apparatus in water normally assumes the position shown in FIGS. 1 and 3, and seeks and returns to that position if displaced therefrom by movement of the water 13. Diametrically of said body 12 as in FIGS. 3 and 4, an attenuated support 18 rises from the section 15 which mounts a lamp 19 at its top surrounding the upper portion of a hood 20, the latter being opaque, translucent or otherwise according to the reflection or ornamental effect desired, but preferably having its concave interior wall forming a reflecting surface 21 for light rays emanating from lamp 19 to reflect them downwardly against the upper reflecting surface 22 of a ring-shaped generally horizontal reflector plate 23 concentric with the support or standard 18 and supported in any suitable way from the body section 15 as by spaced inwardly radiating rods 24 as best shown in FIG. 4. Said reflector plate 23 may carry any suitable plurality of parabolic or equivalent depending shells or reflectors 25, the same having their inner concave surfaces mirror-like to upwardly reflect light rays, the reflector plate 22 having openings, one in line with each shell 25 as shown.

The light rays reflected by the shells 25 pass through a generally horizontal color screen 26 disposed above and substantially parallel to the reflector 22, having portions 27 of plastic or other suitable material and of any desired color or hue, and which may be of different colors or hues to give the same or intermingled to obtain any desired color effect, such panels for example being red, orange, green, blue or otherwise so that the emitted light rays will be variably intermingled.

Reverting to the watertight joint 17 between the sections 15 and 16, a ring gasket 28 is interposed between marginal flanges 29 of said sections, through which and the gasket 28 the previously mentioned bolts 17 pass, said gasket having inward extensions 28a mounting or supporting the color screen 26.

The said support or standard 18 is maintained vertical and will seek the vertical as stated since it is appropriately weighted and balanced as best shown in FIG. 3, primarily by a motor 30 and a water pressure tank 31 and an associated pump 32, the motor 29 and tank 31 being disposed on opposite sides of said support or standard, and the pump for instance being part of said standard or support. Said motor is preferably electric and current is supplied thereto through cable means 33, for instance from a source on land. Passing watertight through section 15 is a gasket grommet 33'. Motor 30 through a shaft 34 operates the pump 32, the latter having its inlet suggested at 35 so that it may suck water from the body 13 and under pressure discharge the same through a pipe or conduit 36 into the tank 31, from which the said pressure disperses it through diverging manifold pipes 36 forming part of a skeletonized sprayer head 37 generally following the spherical inner surface of the section 16, such head comprising arcuate and skeletonized conduits or pipe 38 having radiating nozzles or jets 39 extending through and preferably slightly beyond the convex surfaces of the body section 16 and thus spraying and showering the water according to any desired pattern, preferably generally upwardly and radial from the center of the spherical body 12. A rod 20' suspends reflector 20 from sprayer head 37.

Each shell 25 at its base carries a socket 40 to which electric current from the said cable means 33 is fed through branch cable means 41 passing interiorly of the standard 18, and through branch cables 42 to the sockets 40 and through another branch cable 43 to the lamp 19. Conventionally electrically connected to each socket 40 is a lamp or bulb 44.

At the junction of the conduits 41, 42 and 43, a conventional flasher unit 45 is electrically connected, being carried by the support or standard 18, the electric current thus also energizing the lamps 44 so that the rays of light therefrom will be reflected against the concave wall of the shells 25, thence upwardly through the variously colored panels or disks 27, the light rays from the lamps 44 and the lamp 19 further being reflected by the surface 22, and all reflected light rays passing through the wall of the upper body section 16 which illuminates and intermingles with the sprays or jets of water and the surrounding atmosphere. The flasher unit 45 will control the emission of light at lamps 44 as well as the lamp or bulb 19, if desired, for any suitable intervals of time, thus effecting intermittent illumination of lamps 44 and/or the bulb 19.

In operation, the spherical body 12 will be disposed in the water 13 of a pool or any desired body of water, being buoyant therein and capable of floating to the extent permitted by the cable means 33. With the cable means 33 connected to a source of electricity, usually on land, the motor 34 will be energized, thus operating the pump 32 which at 35 sucks in water and delivers it under appropriate pressure to the tank 36 from which it rises under that pressure through the diverging manifolds 36 and thence through sprayer head 38 and nozzles 39 forming a shower of exterior sprays according to the pattern of the nozzles 39, the sprays being illuminated by the rays of light from the lamps or bulbs 19 and 44 suitably reflected by the various reflecting surfaces at desired intervals, under control of the flasher 45, the light rays for the most part being reflected through panels or disks 27 of suitable color or hue and preferably varying in color so as to give a novel and very desirable intermingling ornamental effect to the adjacent water and landscape. The effect of the sprays and light rays and intermingling of the different sprays of water is enhanced through the movement the water imparts to the spherical body 12.

Figure 7:
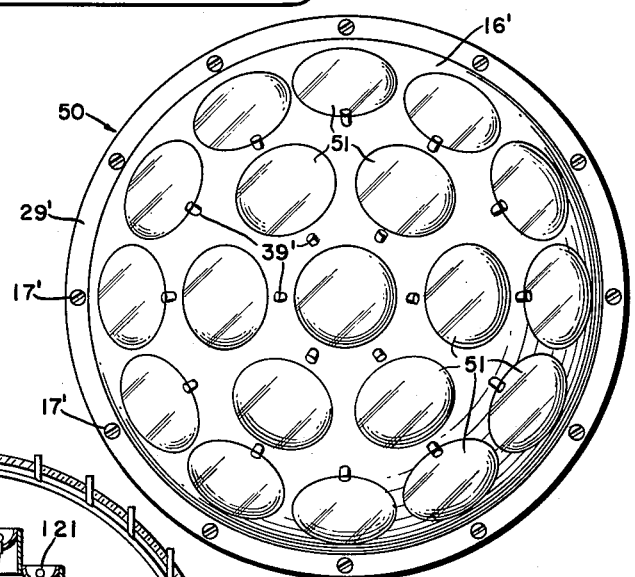
FIG. 7 is a top plan view of the sphere of FIG. 5 particularly showing the upper body section as having a multiplicity of bulging protuberances.

The basic invention may be carried out in various constructions and features thereof be employed on land as in gardens, or otherwise, some of which modifications being now described:

Referring now to FIGS. 5, 6 and 7, a spherical body 50 constructed in sections and of the same materials as in the first embodiment, has a body section 15 similar to that of such first embodiment. It is completed by a diaphanous upper body section 16' like that at 16 which has a suitable plurality of bulging protuberances 51. This form of the invention also employs the lamp 19, standard or support 18, pump 32, electric motor 34 and pressure tank 31, similar to the corresponding elements in the first embodiment, the lamp 19 and motor 34 being energized in the same manner. A skeletonized sprayer head 52 similar to that at 37 is connected to the pressure tank 31 with its outlet nozzles 39' extending through the upper body section 16' according to the same pattern between the various bulging protuberances 51. Such spray head in this modified form of FIGS. 5, 6 and 7 optionally includes impellers 53 as detailed in FIG. 6, 54 being casings and the impeller elements of which 55 are rotary and drive coloring apparatus or the like. In this second modified form a plurality of dished reflectors 56 are employed, being suitably supported as at 57 from the interior surface of the lower body section 15.

Inward projections on the casings 54 of impellers 53, as at 58, support a color screen 59 of similar construction to the color screen 26 of the first form, having the colored or hued panels designated 27'. The reflectors 56 are disposed one beneath each of the panels or disks 27', and their concave reflecting surfaces 59 will reflect light rays from lamp 19 upwardly through panels 27' and thence through the upper body section 16', particularly through the bulging protuberances 51 where the same assist and give the ornamental effect described in the first form in combination with the water sprays.

It should be mentioned also that above the lamp 19 a reflector 21' is suspended by a rod 60 from the sprayer head 52. This reflector 21' at its inner surface receives the light rays from the lamp 19 to reflect them particularly against the surface 59. In this form of reflector, which may be like that at 21, may be exterior reflecting elements 61 arranged according to any desired pattern and color or a composition to further enhance the novel effect through reflection. In this form, the sections 15 and 16' have outwardly extending flanges 29' with a suitable inner gasket 28' interposed between them and through which flanges 29' and gasket 28' and fastening bolts 17' pass to provide the necessary water-tight joint between the body sections.

In the further modified form of FIG. 8, a buoyant spherical body of identical construction and material like body 12 in FIG. 1 is employed. Here, a vertical support or standard 18' rises rigidly from the lower center of the inner surface of body 12' with an electric lamp 19' mounted at the top. In the same body of water in which the buoyant body 12' is disposed, is a combined motor and suction pump unit 62 preferably electrically energized by current from any suitable source usually on land, passing through a cable means 63, the cable means being continued at 64, and passed interiorly of the spherical body at a portion 65 passing interiorly of the support or standard 18' and connected to the lamp 19'. The water sucked in and pumped by the unit 62 passes through a rigid or flexible pipe 66 which is connected at the top of the spherical body 12' and interiorly thereof to a sprayer head 67 substantially like that at 37, and whose discharge jets 68 extend through the upper section of the spherical body and for the most part are disposed vertically, as shown.

The head 67 has a central depending rod 69 which suspends a relatively large parabolic or dome-shaped reflector element 70 whose inner concave surface 71 is of reflecting material. Surrounding the reflector 70 at the base thereof is a color screen 72 which may be identical with and supported as in FIG. 2, the colored or hued panels being designated 73 and variably colored or hued as described with respect to those at 27 an 27'. While it is not necessary to use impellers in the spray head 77, yet they may be optionally employed at 74 and be of the same construction as disclosed in the form of FIGS. 5, 6 and 7. Supporting projections 58' for the color screen 72 correspond in construction and function to those used at 58.

A suitable system for upwardly reflecting the light rays from the lamp 19' through the filter screen 72 and upper portion of the body section is employed, being shown, for example, as a relatively large reflector 80 fastened marginally to the lower section of the spherical body 12'. Such reflector 80 is centrally open and has a concave upper surface 81 which is mirror-like or of reflecting material.

The form of FIG. 9 employs a ball or spherical body 12-A shaped and of the same material substantially as in FIGS. 3 and 8. The motor 81, pump 82, pressure chamber 83, and upright or support 84 including the connections correspond to the parts 34, 32, 36 and 18 in FIG. 3. The water shower sprayer head 37 in this form is similar to that employed in FIG. 3, aside from the impellers 85 corresponding to those used at 53 in FIG. 2 which may or may not be used as preferred. The diverging manifolds 86 in this form leading to the sprayer head 37 are shown at 85 connected as in FIG. 3. The outlet nozzles or orifices corresponding to those at 39 for the most part are vertical as shown at 87. The light screen at 88 is like the one employed in FIGS. 3, 5 and 8, being supported by arms 89 corresponding to those at 88' in FIG. 8. Beneath the light screen 88 and in line with the colored or hued panels 90 thereof, are parabolic reflectors or shells 91 like those at 25 which are supported in any suitable way by the lower section of the ball or spherical body 12-A. Electric lamps 92 are located within the shells or reflectors 91, the latter having concave reflecting surfaces whereby the lamps 92 will reflect the rays upwardly through the panels 90 and the upper portion of body 12-A.

In addition, a central reflector body 93 is connected to and rises above the color screen 88, the same having a number of parabolic reflectors or shells 94, and electric lamps 95 in each of them, the concave surfaces of the shells 94 being so associated with the lamps 95 that the rays thereof will be reflected upwardly through the upper portion of the ball or spherical body 12-A. The ornamental effect is enhanced by the terraced or cascade arrangement of the shells or reflectors 94 and it should also be mentioned that rings 96, making up the reflector body 93 have exterior reflecting surfaces. Unit 95 is a flasher connected as in FIG. 3. From the cable means 33 which supplies the electric current to the various parts, extend branch cable means 96 to the lamps 92 and 95.

Referring now to FIG. 10, a spherical body 100 corresponds in shape, material and construction to that employed, for instance, in FIG. 8, the parts within such body 100 corresponding to the parts within the body 12' of FIG. 8 aside from the fact that the water for the spray head 67 is taken from a semi-spherical reservoir formed by a semi-spherical wall 101 larger than and surrounding the adjacent portion of the body 100 being connected thereto and closed at the top as at 102. This embodiment of the invention is adapted to be land-supported as by pedestal means 103. Water under pressure from any suitable source is supplied to the reservoir through a pipe 104, the water being shown in the reservoir at 105, and being adapted to be sucked in at an intake 112 and forced under pressure by a pump 106 through a pipe 107 into a pressure tank 108 and from the same through diverging manifolds 109 to the shower sprayer head 67. Pump 106 is operated by an electric motor 110 which receives current from a land source through a suitable cable means 111 which enters water-tight at a grommet 113 through the wall of the lower section of the ball or spherical body 100. It is to be noted that the parts 106, 107, 108, 109, 110, 111 and 112 correspond to the parts 32, 36, 31 and 33 respectively as of FIG. 3.

Figure 11:
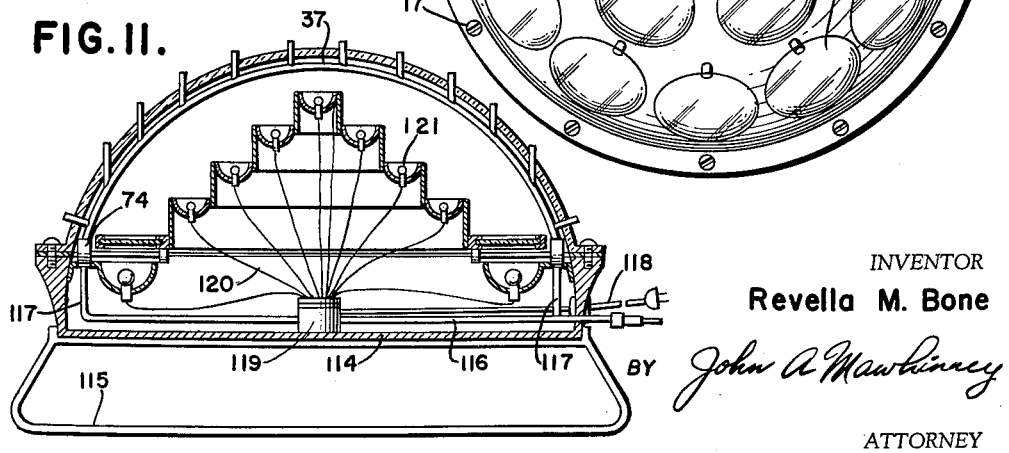
FIG. 11 is a vertical section taken through a second ground supported form.

In the further embodiment of FIG. 11, another land type is shown, the same corresponding essentially to FIG. 9 with the motor and pump 82, pressure chamber 83, divergent manifolds 86 and flasher 98 omitted.

The body instead of being a ball or spherical, has a shallow lower section with a flat bottom wall 114 and a ground supporting means or pedestal at 115. In lieu of the divergent manifolds 86, water under suitable pressure from any land source is supplied through a manifold pipe 116 having branches 117 connected at the optionally employed impellers 74 or otherwise to the shower spray head 39. The electric current is supplied through a suitable cable means 118 connected with any suitable land source, and passed watertight through the lower section of the body through the standard 119 replacing that shown at 84 and which cable means 118 has branches 120, like those at 96, leading to the lamps 121 similar to those at 95.

I claim as my invention:

1. A fountain display unit comprising a hollow spherical body, a diametric support rising therein, a motor and a water pressure tank on opposite sides of said support, a pressure pump between said motor and tank driven by said motor to supply water to said pressure tank, manifold means extending laterally in opposite directions from said tank, said body having a light penetrable section, a skeleton sprayer in said body about said section to which said manifold means lead, a nozzle on said sprayer extending through the wall of said section to provide a shower exteriorly thereof, illuminating means within said body, a color filter adjacent said illuminating means, and means having mirror surfaces to reflect light rays from said illuminating means through said filter and wall onto said shower.

2. A fountain display unit according to claim 1 wherein the wall of said light-penetrable section has portions bulging outwardly.

3. A fountain display unit comprising a hollow body having a generally dome-shaped wall and a sprayer head within the body of reticulate form and approximately following the interior contour of said wall, said sprayer head having a plurality of outlet jets extending exteriorly of the body through said wall, means for the supply of water into the interior of the body and liberation therefrom through said sprayer head so that said jets will produce an exterior shower about said wall, illuminating means within the body, means within the body to reflect rays of light from said illuminating means through said wall and onto said shower, color means within the body through which reflected light rays pass before emission through said wall, a support, a lamp surmounting said support, said water supplying means comprising pressure means, and a reflector suspended from said shower sprayer head disposed over said lamp to direct light rays downwardly therefrom.

References Cited in the file of this patent

UNITED STATES PATENTS

| | | |
|---|---|---|
| 492,999 | Trouve | Mar. 7, 1893 |
| 1,839,994 | Proffatt | Jan. 5, 1932 |
| 2,745,697 | Pearse | May 15, 1956 |
| 2,888,205 | Trucco | May 26, 1959 |